United States Patent
Rick

(10) Patent No.: US 10,571,315 B2
(45) Date of Patent: Feb. 25, 2020

(54) SINGLE-BEAM RADAR LEVEL AND VELOCITY SENSING

(71) Applicant: Hach Company, Loveland, CO (US)

(72) Inventor: David L. Rick, Longmont, CO (US)

(73) Assignee: HACH COMPANY, Loveland, CO (US)

( * ) Notice: Subject to any disclaimer, the term of this patent is extended or adjusted under 35 U.S.C. 154(b) by 208 days.

(21) Appl. No.: 15/711,483

(22) Filed: Sep. 21, 2017

(65) Prior Publication Data

US 2019/0086247 A1 Mar. 21, 2019

(51) Int. Cl.
- *G01S 13/58* (2006.01)
- *G01F 1/00* (2006.01)
- *G01S 17/58* (2006.01)

(52) U.S. Cl.
CPC ............ *G01F 1/002* (2013.01); *G01S 13/584* (2013.01); *G01S 17/58* (2013.01)

(58) Field of Classification Search
CPC .................................................... G01S 13/584
See application file for complete search history.

(56) References Cited

U.S. PATENT DOCUMENTS

| | | | |
|---|---|---|---|
| 5,315,880 | A | 5/1994 | Bailey |
| 5,811,688 | A | 9/1998 | Marsh et al. |
| 8,874,390 | B2 | 10/2014 | Rick |
| 9,453,853 | B2 | 9/2016 | Rick |
| 9,625,295 | B2 | 4/2017 | Rick |
| 2007/0165488 | A1 | 7/2007 | Wildey |
| 2010/0031753 | A1 | 2/2010 | Mayer et al. |
| 2011/0239781 | A1* | 10/2011 | Petroff ................... G01F 1/002 73/861.28 |
| 2013/0333483 | A1* | 12/2013 | Horoshenkov ..... G01F 23/2962 73/861.25 |
| 2015/0007653 | A1 | 1/2015 | Fehrenbach et al. |
| 2017/0016984 | A1* | 1/2017 | Lin ....................... G01S 13/584 |

OTHER PUBLICATIONS

Vaidyanathan, P.P. et al., "Efficient Reconstruction of Band-Limited Sequences from Nonuniformly Decimated Versions by Use of Polyphase Filter Banks", IEEE Transactions on Acoustics, Speech, and Signal Processing, Nov. 1990, 10 pages, vol. 38, No. 11, IEEE Digital Library.

Gladkova, Irina, "Analysis of Stepped-Frequency Pulse Train Design", IEEE Transactions on Aerospace and Electronic Systems, Oct. 2009, 11 pages, vol. 45, Issue 4, IEEE Digital Library.

European Patent Office, European Search Report, dated Jan. 25, 2019, pp. 7.

* cited by examiner

*Primary Examiner* — Justin N Olamit
(74) *Attorney, Agent, or Firm* — Ference & Associates LLC

(57) ABSTRACT

An embodiment provides a method for measuring velocity and depth of fluid flow in a channel, including: transmitting, using a transmitter, directed energy comprising a single energy beam slant-wise toward a surface of a fluid in a fluid channel producing a plurality of reflections, wherein the transmitting comprises modulating a frequency associated with the single energy beam; detecting, at a receiver, received signals from the plurality of reflections; and determining, based upon differences between parameters of the transmitted single energy beam and parameters of the received signals, the velocity of the fluid and the depth of the fluid. Other embodiments are described and claimed.

20 Claims, 4 Drawing Sheets

SINGLE-BEAM RADAR LEVEL AND VELOCITY SENSING

BACKGROUND

The measurement of open channel flow in municipal wastewater collection systems is important to protect public health, municipal infrastructure, and the environment. Raw (untreated) drinking water, irrigation water, and plant effluent water are also transported via engineered open channels and pose similar measurement challenges. Accurate flow metering is necessary for billing, engineering studies, mitigation of unwanted inflow and infiltration, and for the control of the actual flow itself. Flow volumes must be understood and managed to minimize the impact of peak flows on wastewater treatment facilities and to reduce the possibility of untreated sewage reaching the environment.

There are a number of open channel flow meters in existence today. For example, there is a flow meter for measuring both the fluid velocity and the fluid level by non-invasive level sensors and velocity sensors that can be mounted inside a manhole above the flowing channel (typically just above the top of the pipe or culvert, a crown mount). By way of example, an energy beam may be directed toward the surface of a fluid flowing in an open channel. The beam may comprise directed waves of electromagnetic or acoustic energy. Examples of electromagnetic beams include radar and laser beams. A typical acoustic beam may utilize directed ultrasonic energy. Any such beam may be considered to transmit an oscillatory signal, characterized by a particular oscillation frequency or spectrum of frequencies. In each case, the energy beam is directed along a line toward the fluid surface and at least a portion of the transmitted energy is reflected from the fluid surface and subsequently received by the sensor. This reflected energy is then analyzed as a signal carrying meaningful information. In particular, the Doppler frequency shift between the directed and reflected signals is used as a measure of the velocity of the fluid surface. Typically, a non-invasive measure of the fluid depth is also obtained, e.g., using downward-looking ultrasonic, microwave, or other measurement techniques. Often, what is measured is the time delay between a transmitted energy pulse and its subsequent reflection from the fluid surface. From this delay, the vertical distance ("range") between the sensor and the fluid surface is determined. Prior knowledge of the sensor mounting position relative to the channel bottom allows conversion from range to fluid depth. Finally, by combining the determined velocity and depth with prior knowledge about the cross-sectional shape of the channel, the volumetric flow rate of the fluid is calculated.

BRIEF SUMMARY

One embodiment provides a method for measuring velocity and depth of fluid flow in a channel, comprising: transmitting, using a transmitter, directed energy comprising a single energy beam slant-wise toward a surface of a fluid in a fluid channel producing a plurality of reflections, wherein the transmitting comprises modulating a frequency associated with the single energy beam; detecting, at a receiver, received signals from the plurality of reflections; and determining, based upon differences between parameters of the transmitted single energy beam and parameters of the received signals, the velocity of the fluid and the depth of the fluid.

Another embodiment provides a device for measuring velocity of fluid flow in a channel, comprising: a transmitter; one or more receivers; a processor operatively coupled to the transmitter and the one or more receivers; a memory device that stores instructions executable by the processor to: transmit, using the transmitter, directed energy comprising a single energy beam slant-wise toward a surface of a fluid in a fluid channel producing a plurality of reflections, wherein the instructions executable by the processor to transmit further comprise instructions executable by the processor to modulate a frequency associated with the single energy beam; detect, using the receiver, received signals from the plurality of reflections; and determine, based upon differences between parameters of the transmitted single energy beam and parameters of the received signals, the velocity of the fluid and the depth of the fluid.

A further embodiment provides a product for measuring velocity of fluid flow in a channel, comprising: a storage device having code stored therewith, the code being executable by a processor and comprising: code that transmits, using a transmitter, directed energy comprising a single energy beam slant-wise toward a surface of a fluid in a fluid channel producing a plurality of reflections, wherein the code that transmits further comprises code that modulates a frequency associated with the single energy beam; code that detects, using a receiver, received signals from the plurality of reflections; and code that determines, based upon differences between parameters of the transmitted single energy beam and parameters of the received signals, the velocity of the fluid and the depth of the fluid.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
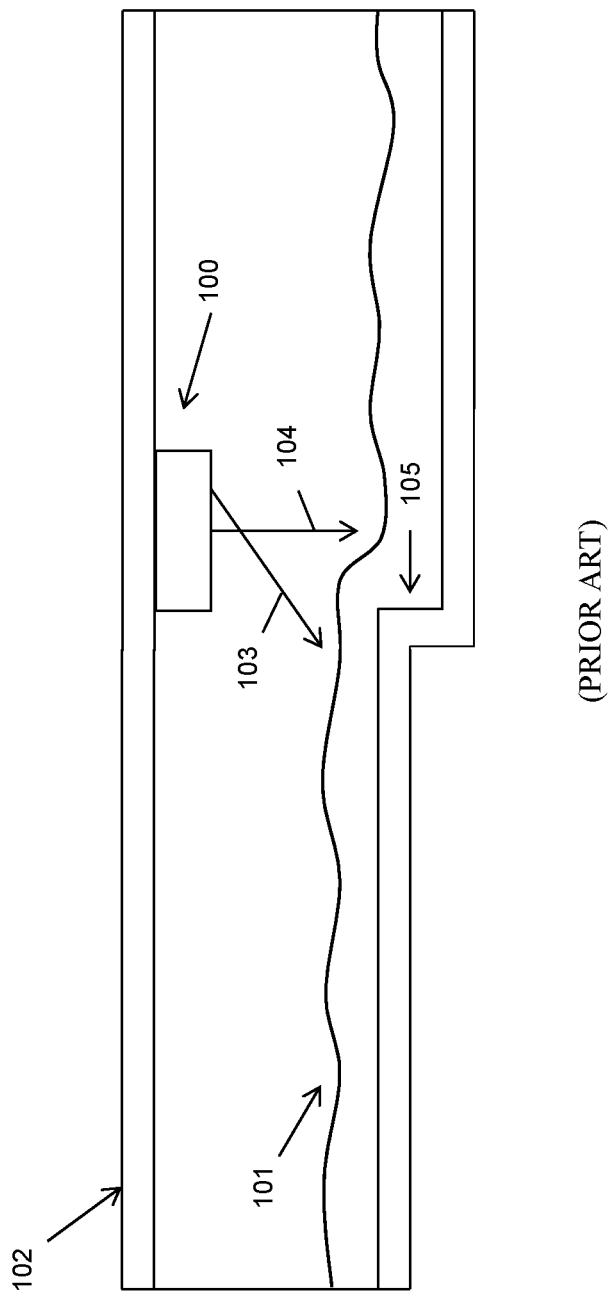
FIG. 1 illustrates a conventional non-contact measuring system measuring fluid level and velocity in a pipe.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Measurement of volumetric flow (Q) in an open channel context where a pipe or other fluid conduit has a defined cross-section, is based on the area-velocity concept:

$$Q=VA,$$

where A is the area of a filled channel cross-section, and V is the average fluid velocity through that area. In channels of known cross-section, the value of A can be inferred from the fluid depth. Also, the value of V (the cross-sectional average velocity) can be inferred from a surface velocity measurement.

In harsh environments such as underground fluid conduits non-contact measurement technologies are particularly desirable due to lower maintenance costs. HACH Company's existing FLO-DAR product provides non-contact measurement of average velocity (V) and area (A). The FLO-DAR product utilizes a radar-based measurement of surface velocity and an ultrasonic measurement of fluid level, although other measurement techniques may be employed. FLO-DAR is a registered trademark of Hach Company in the United States and other countries. Competing instruments use one of several velocity measurement techniques (radar, laser, ultrasonic, etc.) in combination with a second ultrasonic or radar level sensor.

A drawback in non-contact measuring techniques is that the level and velocity measurements are made by two distinct energy beams. For example, fluid level is generally measured using a vertically-oriented (or substantially vertically-oriented) measurement beam, whereas velocity is generally measured using a slant-wise beam. This is done because a vertically-oriented beam cannot observe a Doppler shift from a horizontally-oriented fluid surface. Consequently, fluid level and velocity are measured at two distinct locations at the flow surface and may therefore lead to significant measurement inaccuracies. For example, many measurement sites exhibit hydraulic steps in level that may vary in depth and location over time. If the cross-sectional area of the flow is not the same at both points of measurement (i.e., the fluid level measured by one sensor beam is different than the fluid level where the second sensor beam measures velocity), the computed volumetric flow will be in error.

It follows that a sensor system capable of minimizing these potential computational inaccuracies and generating a more accurate bulk flow value is desirable. Accordingly, an embodiment provides a non-contact flow sensor capable of measuring both, flow velocity and fluid level, with the same radar beam. In an embodiment, a transmitter outputs, in modulated pulses, directed energy through a single energy beam toward a surface of a fluid in a fluid channel. The intended effect of this targeted beam generation is to produce a plurality of reflections off of the fluid surface, which an embodiment detects utilizing a receiver. Responsive to the detecting, an embodiment determines the velocity and the depth of the fluid flow based upon the differences between the demodulated transmitted and received signals.

The illustrated example embodiments will be best understood by reference to the figures. The following description is intended only by way of example, and simply illustrates certain example embodiments.

In FIG. 1 there is illustrated a conventional non-contact measuring system 100 for measuring velocity and fluid level of a fluid 101 in a fluid channel 102 (e.g., in a pipe, other enclosed area, etc.). The velocity of the flow 101 may be measured by utilizing a slant-wise beam 103 while the fluid level may be measured by utilizing a vertically-oriented beam 104. The combined measurements may be used to calculate the bulk flow of the fluid 101 in the channel 102.

As may be appreciated from reviewing FIG. 1, inaccuracies may result in the calculation of the bulk flow because the cross-sectional area of flow may not be the same at both points of measurement. A primary reason for this is at the two beams contact the surface of the fluid 101 at different points. For example, as illustrated in FIG. 1, the beam associated with velocity measurement 103 contacts the fluid at a different location than the beam associated with fluid level measurement 104. Inaccuracies in measurement may be exacerbated if a structure 105 (e.g., a hydraulic step, other structure affecting fluid level depth, etc.) is present in the area where the beams contact the flow. In such a situation, for example, the depth of the fluid 101 may be much higher at one beam contact location than at the other.

Figure 2:
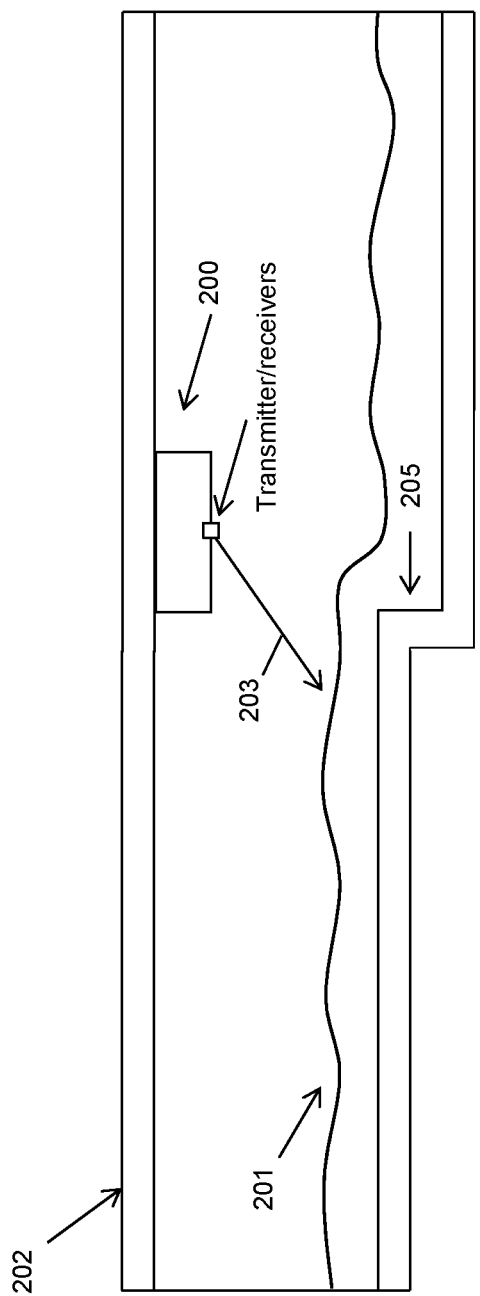
FIG. 2 illustrates a single beam non-contact measuring system measuring fluid level and velocity in a pipe.

Illustrated in FIG. 2 is an example implementation of a non-contact, single beam flow level and velocity measurement system 200 according to an embodiment. The single beam system 200 is capable of measuring fluid level and fluid velocity by utilizing a single slant-wise beam 203 of directed energy. Such a system may reduce inaccuracies when computing the bulk flow because only a single transmitted beam 203 is used that contacts the surface of the fluid 201 at just one point.

Figure 3:
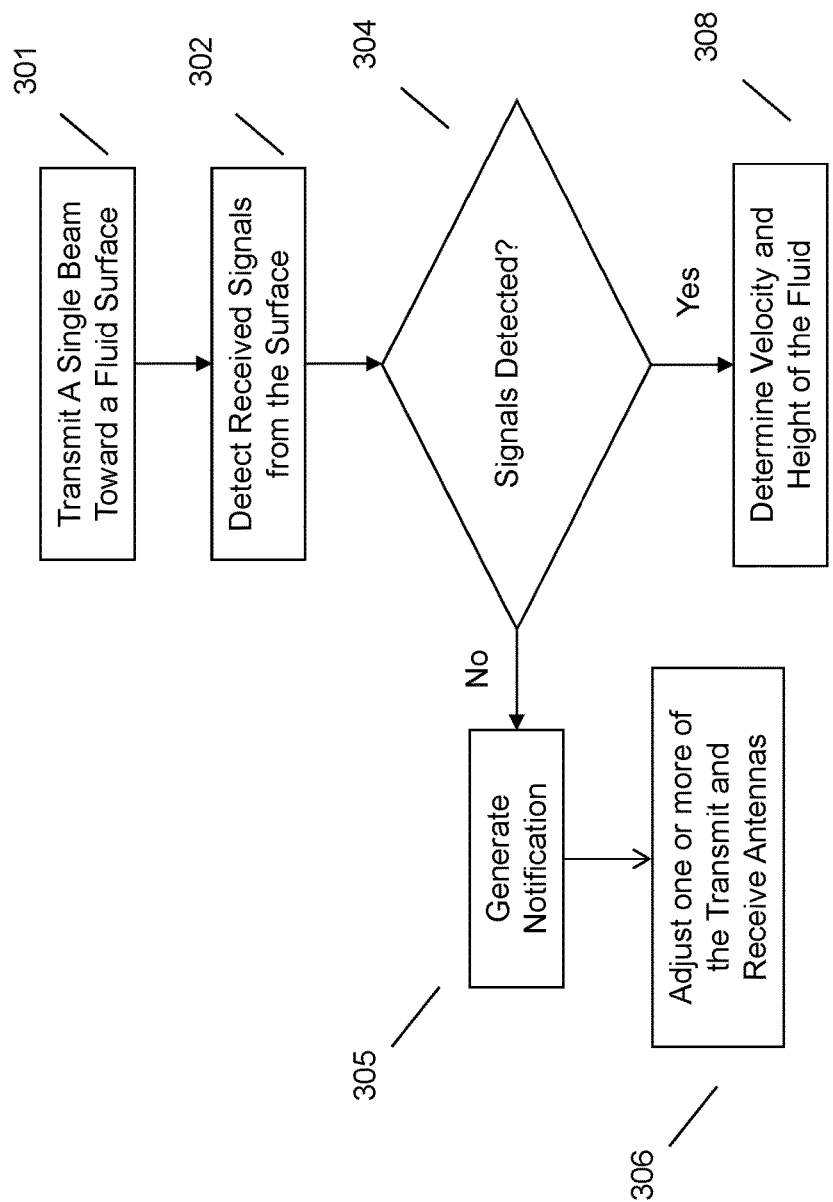
FIG. 3 outlines an example method of determining fluid level and velocity utilizing a single-beam system.

Referring now to FIG. 3, an example method of measuring fluid level and fluid velocity according to an embodiment is presented. At 301, an embodiment may transmit a single beam 203 toward a fluid surface 201. In an embodiment, the single beam 203 may comprise electromagnetic energy, ultrasonic energy, acoustic energy, or a combination thereof. In an embodiment, the single beam system 200 may include a radar-based sensor or transducer capable of transmitting the beam 203 and receiving the plurality of reflections that result from the beam 203 contact with the fluid 201. The system 200 may employ a single transmit/receive antenna or may use one or more dedicated transmit antennas and one or more dedicated receiver antennas. In an embodiment, the single beam system 200 may be optimized for a beam angle of between about 25 and about 45 degrees above the fluid surface 201, where about 35 degrees is the most-preferred angle. In an embodiment, the single beam system 200 may be positioned at an optimal location for interference-free beam transmission. For example, the single-beam system 200 may be mounted to an upper portion of the inside of an enclosed pipe 202, as shown in FIG. 2.

When conducting the transmission of the beam 203, unwanted signal leakage between transmit and receive antennas may occur, such that some portion of the transmitted signal is received immediately with no time delay. (Similarly, non-delayed leakage of the transmitted signal may occur within the radar receive circuitry.) As a result, a leakage peak appears in a demodulated spectrum graph as if it were a target at zero range. There exists a danger that a target peak may be completely hidden by the spectral "skirts" of the leakage peak if the fluid surface is close to the antenna. The "side lobes" that appear adjacent to the zero-range peak may likewise obscure the desired target peak.

To prevent these problems, it is desirable to reduce both the width of the leakage peak and the height of its side lobes. The peak width may be reduced by increasing the total "modulation bandwidth" of the transmitted signal spectrum. To reduce the side lobe height, it is necessary adjust the spectrum of the transmitted signal so that it has more power near its mean frequency value and less power at frequencies farther remove from the mean frequency. Reduction of range side lobes by means of such "spectral tapering" is well known to those skilled in the art.

Also, to avoid "range aliasing", an embodiment may utilize "pulse diversity" to modulate the frequency of the transmission beam so that successive modulation periods are dissimilar. Pulse diversity is preferable to periodic modulation because periodic modulation techniques simply repeat the modulation waveform and, as a result, the zero-range leakage peak will be caught up and replicated at the same frequency levels as the modulated waveforms. In an embodiment, pulse diversity can be achieved in a variety of ways. For example, a user can vary the radar pulse amplitudes, vary the spacing between pulses, vary the starting phase of successive pulses, vary the pulse starting frequencies, or change their FM modulation slopes. Varying the pulse starting frequencies has the advantage that it can be used both to increase the modulation bandwidth and to shape the transmitted spectrum in a favorable way.

In an embodiment, voltage controlled oscillators (VCO) may be operatively coupled to each of the transmit and receive antennas. These oscillators may be capable of operating in both continuous wave (CW) mode and frequency modulated continuous wave (FMCW) mode so that a constant frequency offset is maintained between the oscillators during measurement intervals. This offset may be used to produce a non-zero IF frequency. Alternatively, the system may be designed as a "homodyne receiver", producing an IF frequency of zero. This choice allows use of a single VCO, operatively coupled to both the transmit and receive antennas, but comes at the expense of higher receiver noise. When there is concern that the receiver noise may hide the desired range peak, a "heterodyne" system employing two or more VCO's is preferable because it allows receiver's nominal IF position to be chosen away from the region of higher "flicker noise" that occurs near zero frequency. Conversely, the use choice of a homodyne architecture prevents the possible widening of the leakage peak due to oscillator "phase noise". Phase noise becomes increasingly important at long ranges; for ranges of 5 meters and below, "flicker noise" is usually a bigger concern. Consequently, the preferred embodiment for these shorter ranges is a heterodyne receiver wherein two VCO's are locked to the same reference clock.

In an embodiment, ramping phase locked loop(s) (PLL) may be utilized to control the VCO(s) and thereby to produce diverse pulse trains that comprise a set of linear FM "chirps," each with a different starting frequency. Conventional PLLs compare the VCO output frequency against a lower-frequency reference clock of high stability, and adjusts the VCO's control voltage to maintain the VCO frequency at a fixed multiple of the reference clock frequency. In a "fractional-n" PLL, the clock multiplication value is generally of the form:

$$n/2^b$$

where b is a fractional bit count and n is an inter represented by more than b bits. Ramping PLL chips can automatically change the value of n in small steps. This allows for easy production of FM ramps that may be easily adjusted to change the starting frequency of successive ramps, and the ramp slopes and starting phases can also be controlled. In an embodiment, the modulation of the frequency may be conducted according to a predetermined formula. For instance, the ramp slopes may be chosen to produce a particular ratio between target range and frequency shift in the analyzed IF signal. The starting frequencies may be chosen to determine the transmitted signal's modulation bandwidth for the purpose of reducing the width of the leakage peak. Moreover, the starting frequencies may be chosen to control to control the transmitted signal's spectral tapering and thereby to reduce the height of the range side lobes.

In an embodiment, the PLL chips may be controlled so that the system alternately produces FMCW (chirped) transmit signals and CW (fixed-frequency) signals, transmitted alternately on the same energy beam. In a preferred embodiment, the CW signal is used in measuring surface velocity and the FMCW signal is used in measuring range (level). In another embodiment, FMCW signals are used for both purposes.

At 302, an embodiment may detect received signals from the surface of the flow. Subsequent to the single beam 203 making contact with the fluid surface 201, a plurality of beam reflections are created. In an embodiment, a receiver operatively coupled to the single beam system 200 may be oriented to detect and distinguish the plurality of reflections. In an embodiment, the receiver is optimized for beam angle ranges between 25 degrees and 45 degrees above a fluid surface, where about 35 degrees is the most-preferred angle.

At 308, responsive to detecting signals at 304, an embodiment may determine the velocity and the depth of the fluid. In an embodiment, the output from the received reflections may be spectrally analyzed. In an embodiment, a receive mixer may be utilized to demodulate the detected reflections to a chosen IF position prior to spectral analysis. From the differences between the transmitted and received signals, fluid depth data and fluid velocity data may be obtained. In an embodiment, the data may be stored locally (e.g., on the device), remotely (e.g., the cloud, network storage location, etc.), or a combination thereof.

At 305, responsive to not detecting any signals at 304, an embodiment may notify a user that no signals have been detected. The notification may be, for example, a visual notification (e.g., using a notification box, providing a prompt to the user, utilizing another visual representation, etc.) on a display screen of a user's electronic device. Subsequent to the notification, a user may, at 306, adjust one or more of the transmit and receive antennas. The adjustment may be completed manually, or, alternatively, may be completed wirelessly (e.g., utilizing a wireless adjustment technique). Alternatively, the system may adjust one or more antennas automatically without notifying the user.

The various embodiments described herein thus represent a technical improvement to open-channel flow measurement techniques. Using the techniques described herein, an embodiment may accurately determine the fluid level and fluid velocity of an enclosed flow by utilizing only a single transmitted energy beam. Such techniques reduce inaccuracies in volumetric flow calculation because only a single beam is used that contacts the flow at one point.

Figure 4:
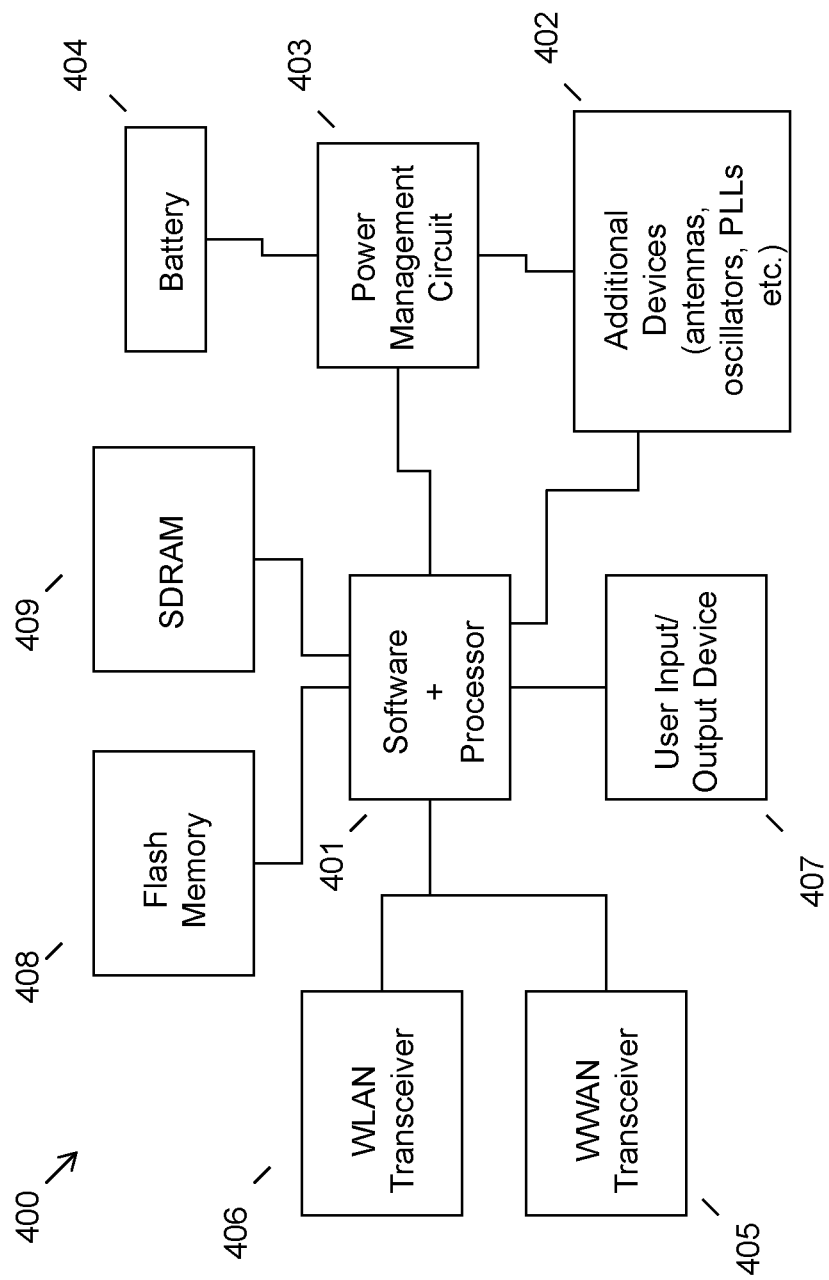
FIG. 4 illustrates an example of computer circuitry.

While various other circuits, circuitry or components may be utilized in information handling devices, with regard to an instrument for measuring fluid level and velocity according to any one of the various embodiments described herein, an example is illustrated in FIG. 4. Device circuitry 400 may include a measurement system on a chip design found, for example, a particular computing platform (e.g., mobile computing, desktop computing, etc.) Software and processor(s) are combined in a single chip 401. Processors comprise internal arithmetic units, registers, cache memory, busses, I/O ports, etc., as is well known in the art. Internal busses and the like depend on different vendors, but essentially all the peripheral devices (402) may attach to a single chip 401. The circuitry 400 combines the processor, memory control, and I/O controller hub all into a single chip 410. Common interfaces may include SPI, I2C and SDIO.

There are power management chip(s) 403, e.g., a battery management unit, BMU, which manage power as supplied, for example, via a rechargeable battery 404, which may be recharged by a connection to a power source (not shown). In at least one design, a single chip, such as 401, is used to supply BIOS like functionality and DRAM memory.

System 400 typically includes one or more of a WWAN transceiver 405 and a WLAN transceiver 406 for connecting to various networks, such as telecommunications networks and wireless Internet devices, e.g., access points. Additionally, devices 402 are commonly included, e.g., an a transmit and receive antenna, oscillators, PLLs, etc. System 400 includes input/output devices 407 for data input and display/rendering (e.g., a computing location located away from the single beam system that is easily accessible by a user). System 400 also typically includes various memory devices, for example flash memory 408 and SDRAM 409.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data.

Embodiments may be implemented as an instrument, system, method or program product. Accordingly, an embodiment may take the form of an entirely hardware embodiment, or an embodiment including software (including firmware, resident software, micro-code, etc.) that may all generally be referred to herein as a "circuit," "module" or "system." Furthermore, embodiments may take the form of a program product embodied in at least one device readable medium having device readable program code embodied thereon.

In a number of embodiments, the devices, systems and method here may, for example, be used in connection with a non-contact measuring system as described in the commonly owned U.S. patent application Ser. No. 15/711,591, entitled "FREQUENCY PROFILES FOR NON-CONTACT RANGE MEASUREMENT WITH MULTI-SCALE ANALYSIS" filed contemporaneously herewith, the disclosure of which is incorporated herein by reference.

A combination of device readable storage medium(s) may be utilized. In the context of this document, a device readable storage medium ("storage medium") may be any tangible, non-signal medium that can contain or store a program comprised of program code configured for use by or in connection with an instruction execution system, apparatus, or device. For the purpose of this disclosure, a storage medium or device is to be construed as non-transitory, i.e., not inclusive of signals or propagating media.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring velocity and depth of fluid flow in a channel, comprising:
    transmitting, using a transmitter, directed energy comprising a single continuous energy beam, comprising a continuous wave and a frequency modulated continuous wave, slant-wise toward a surface of a fluid in a fluid channel producing a plurality of reflections, wherein the transmitting comprises modulating a frequency associated with the single energy beam;
    detecting, at a receiver, received signals from the plurality of reflections of the transmitted energy beam; and
    determining, based upon differences between parameters of the transmitted single energy beam and parameters of the received signals, the velocity of the fluid and the depth of the fluid.

2. The method of claim 1, further comprising at least one oscillator, wherein the at least one oscillator is operatively coupled to the transmitter and the receiver.

3. The method of claim 2, further comprising at least one ramping phase locked loop operatively coupled to the at least one oscillator.

4. The method of claim 2, wherein the at least one oscillator operate in at least one mode, wherein the at least one mode is selected from the group consisting of a continuous wave mode and a frequency modulated continuous wave mode.

5. The method of claim 3, wherein the modulating comprises adjusting successive modulation periods.

6. The method of claim 5, wherein the adjusting comprises varying at least one pulse attribute selected from the group consisting of: pulse amplitude, spacing between at least two successive pulses, a starting phase of successive pulses, and pulse starting frequency.

7. The method of claim 1, wherein the modulating is conducted according to a predetermined formula.

8. The method of claim 1, wherein the directed energy is selected from the group consisting of: electromagnetic energy, ultrasonic energy, and acoustic energy.

9. The method of claim 1, wherein the receiver is oriented to detect and distinguish the plurality of reflections.

10. The method of claim 9, wherein the receiver is optimized for a beam angle range between 25 degrees and 45 degrees above a fluid surface.

11. A device for measuring velocity of fluid flow in a channel, comprising:

a transmitter;

one or more receivers;

a processor operatively coupled to the transmitter and the one or more receivers;

a memory device that stores instructions executable by the processor to:

transmit, using the transmitter, directed energy comprising a single continuous energy beam, comprising a continuous wave and a frequency modulated continuous wave, slant-wise toward a surface of a fluid in a fluid channel producing a plurality of reflections, wherein the instructions executable by the processor to transmit further comprise instructions executable by the processor to modulate a frequency associated with the single energy beam;

detect, using the receiver, received signals from the plurality of reflections; and determine, based upon differences between parameters of the transmitted single energy beam and parameters of the received signals, the velocity of the fluid and the depth of the fluid.

12. The device of claim 11, further comprising at least one oscillator, wherein the at least one oscillator is operatively coupled to the transmitter and the receiver.

13. The device of claim 12, further comprising at least one ramping phase locked loop operatively coupled to the at least one oscillator.

14. The method of claim 12, wherein the at least one oscillator operate in at least one mode, wherein the at least one mode is selected from the group consisting of: a continuous wave mode and a frequency modulated continuous wave mode.

15. The method of claim 13, wherein the instructions executable by the processor to modulate comprise instructions executable by the processor to adjust successive modulation periods.

16. The method of claim 15, wherein the instructions executable by the processor to adjust comprise instructions executable by the processor to vary at least one pulse attribute selected from the group consisting of: pulse amplitude, spacing between at least two successive pulses, a starting phase of successive pulses, and pulse starting frequency.

17. The method of claim 11, wherein the modulating is conducted according to a predetermined formula.

18. The method of claim 11, wherein the directed energy is selected from the group consisting of: electromagnetic energy, ultrasonic energy, and acoustic energy.

19. The method of claim 11, wherein the receiver is oriented to detect and distinguish the plurality of reflections.

20. A product for measuring velocity of fluid flow in a channel, comprising:

a storage device having code stored therewith, the code being executable by a processor and comprising:

code that transmits, using a transmitter, directed energy comprising a single continuous energy beam, comprising a continuous wave and a frequency modulated continuous wave, slant-wise toward a surface of a fluid in a fluid channel producing a plurality of reflections, wherein the code that transmits further comprises code that modulates a frequency associated with the single energy beam;

code that detects, using a receiver, received signals from the plurality of reflections; and code that determines, based upon differences between parameters of the transmitted single energy beam and parameters of the received signals, the velocity of the fluid and the depth of the fluid.

* * * * *